(No Model.)
C. A. SCOTT & J. C. GARDINER.
EARTH AUGER.
No. 472,403. Patented Apr. 5, 1892.
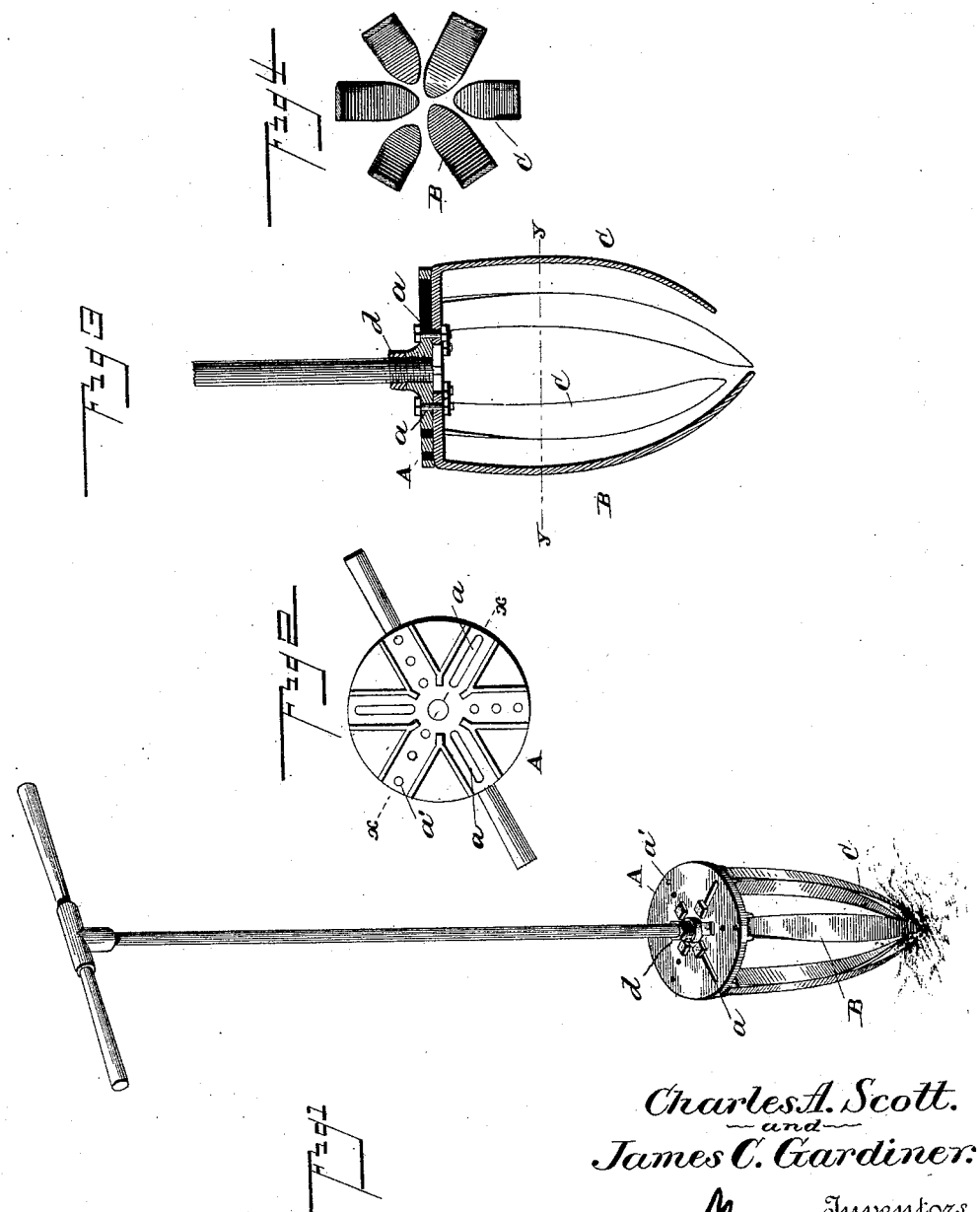
Charles A. Scott
and
James C. Gardiner.
Inventors
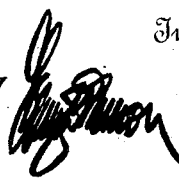
Witnesses

UNITED STATES PATENT OFFICE.

CHARLES A. SCOTT AND JAMES C. GARDINER, OF DAVEY, NEBRASKA.

EARTH-AUGER.

SPECIFICATION forming part of Letters Patent No. 472,403, dated April 5, 1892.

Application filed August 21, 1890. Serial No. 362,625. (No model.)

*To all whom it may concern:*

Be it known that we, CHARLES A. SCOTT and JAMES C. GARDINER, citizens of the United States of America, residing at Davey, in the county of Lancaster and State of Nebraska, have invented certain new and useful Improvements in Earth-Augers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in earth-augers.

The object of the invention is to provide an earth-auger of improved construction, the blades of which can be adjusted for digging different-size post-holes, the same also being provided with supplemental blades for holding the earth within the cutting or digging blades.

With these ends in view the invention consists in the construction and combination of the parts, as will be hereinafter fully set forth, and particularly pointed out in the claim.

In the accompanying drawings, forming part of this specification, Figure 1 is a perspective view. Fig. 2 is a bottom view; Fig. 3, a sectional view on the line $x\,x$ of Fig. 2, and Fig. 4 a transverse section on the line $y\,y$, Fig. 3.

A refers to a metallic plate, preferably circular, which is provided with radiating slots $a$, or the equivalents thereof, as perforations, as shown at $a'$. On the under side of the plate are flanges which are adapted to receive the upper ends of the cutting and retaining blades. Centrally the plate A has an opening through which the handle passes and is attached, said plate A being centrally provided with a threaded aperture within which the screw-threaded end of the handle is passed and clamped by means of a nut $d$. The cutting-blades B have their upper ends bent at right angles, and are adjustably secured by means of bolts and nuts, which pass through the perforations $a'$, the lower portion of these blades being bent inwardly or toward each other, so as to nearly meet. One edge of each of the blades is sharpened. The retaining-blades C are of similar construction, but shorter, and are beveled or sharpened on both their edges. It will be noted that both the cutting and retaining blades are made of slightly-spring metal, and in operation the earth will be gathered and cut by the blades B and deposited within said blades and will be retained therein by the blades C, the plane of which is somewhat within the plane of the cutting-blades. In a post-hole auger thus constructed the earth can be readily lifted out of the hole made by the cutting-blades and can be easily removed by simply shaking the implement. We prefer to provide the retaining-blades C with slots for adjusting the same, for the reason that when the earth is very damp it may be necessary to move one of the blades outwardly in order to remove the earth, and by providing the slot this can be done; but the cutting-blades are provided with perforations to insure uniformity of adjustment, and by alternating the slots and perforations the head or disk is not materially weakened.

We are aware that prior to our invention it has been proposed to provide a post-hole auger with cutting and carrying blades which are adjustable, as is shown in Patent No. 181,036, dated August 13, 1876, and we do not claim such construction, broadly, as our invention; but What we do claim as new, and desire to secure by Letters Patent, is—

The herein-described improvement in earth-augers, comprising a circular head to which a handle is attached, said head having on its under side six pairs of parallel depending flanges adapted to receive three cutting-blades and the same number of earth-retaining blades, each blade being adjustable laterally on the head, the earth-retaining blades being of less length than the cutting-blades and similarly curved, so as to project toward a common center, one set above the other, so that the points of the retaining-blades will lie within the cutting-blades, substantially as set forth.

In testimony whereof we affix our signatures in presence of two witnesses.

CHARLES A. SCOTT.
JAMES C. GARDINER.

Witnesses:
JNO. Q. DENTON,
R. J. GREENE.